United States Patent Office 2,936,272
Patented May 10, 1960

2,936,272
BISPHENOLS

Howard L. Bender, Bloomfield, Francis N. Apel, Nutley, and Louis B. Conte, Jr., Newark, N.J., assignors to Union Carbide Corporation, a corporation of New York No Drawing. Application August 24, 1956
Serial No. 605,923

29 Claims. (Cl. 204—154)

This invention relates to processes for the production of bisphenols.

Bisphenols are produced, for instance, by the condensation of monohydric phenols with ketones in the presence of a condensation catalyst such as hydrochloric acid or sulfuric acid. Often a catalyst or promoter, for example, a sulfur compound such as hydrogen sulfide, an alkyl mercaptan, a thiophenol, or a thio-organic acid, is added to improve the yield of bisphenol and shorten the reaction time. These promoters, however, contaminate the bisphenol with sulfur compounds which impart an undesirable odor and which are difficult to remove. The presence of organic promoter often increases the amount of by-product resin formation, which is difficult to remove when purifying the bisphenol.

It has now been found that a reactive mixture of phenol and ketone, in the presence of an acidic condensation agent, can be rapidly and completely reacted to produce bisphenols by irradiating said mixture with ultraviolet rays or beta rays. The processes of this invention have the advantages of producing bisphenols which are free of promoter impurities and substantially free of high molecular weight by-products, generally less than about 1 to 2% by weight. A further advantage is that the reaction is complete within a shorter period of time.

The irradiation can be carried out by mercury vapor lamps, which emit ultraviolet rays having a wave length of from about 2000 to about 4000 Angstrom units; or with a Van de Graff accelerator, which emits beta particles. Other means of producing the desired radiation are also suitable.

The energy imput required by the irradiation source will vary depending on the particular phenol and ketone mixture that is to be reacted. For example, using a mixture of phenol and acetone ultraviolet rays having a wave length of about 3000 Angstrom units are effective in amounts up to about $4.4 \times 10^8$ ergs per minute of total ultraviolet energy per mole of acetone. Use of higher energy dosages does not markedly accelerate the reaction.

In producing bisphenols by the processes of this invention the reaction can be carried out either as a single stage process or as a two stage process. In the single stage process a reactive mixture of phenol, ketone and acidic condensation agent is prepared and the mixture is then irradiated with ultraviolet rays or beta particles and stirred at the reaction initiating temperature until conversion to bisphenol is substantial or complete. In the two stage process a mixture of phenol and ketone is irradiated, then the acidic condensation agent is added and stirring is continued without further irradiation until conversion to the bisphenol is substantially complete.

The temperature at which the irradiation and condensation steps are carried out will depend on the boiling points and the vapor pressures of the reactants. Generally temperatures of from about 20° C. to about 100° C. are satisfactory, with the preferred range being from about 40° C. to about 60° C. Higher temperatures can be used if desired but one must be careful not to use so elevated a temperature that decomposition, or formation of large quantities of high molecular weight by-products occurs.

At the temperatures indicated the conversion of ketone and monhydric phenol to bisphenol is generally complete in from about 1 to about 20 hours. This reaction time will vary in each particular case depending on the nature of the reactants used and the temperature at which the reaction is being conducted. For example, at a temperature range of from about 40° C. to about 65° C., a reactive mixture of 4 moles of phenol with one mole of acetone in the presence of more than an equal weight of 37% aqueous hydrochloric acid when irradiated with ultraviolet rays will produce a quantitative yield of 2,2-bis-(4-hydroxyphenyl)-propane in from about 3 to about 7 hours.

Among the suitable acidic condensation agents are sulfuric acid (preferably 70% or higher in concentration), concentrated hydrochloric acid, anhydrous HCl, sulfuryl chloride, aluminum chloride, or a mixture of calcium chloride with hydrochloric acid. The preferred condensation agents are a large volume of 70% sulfuric acid or concentrated hydrochloric acid, that is, about an equal or greater weight of acid than the weight of organic reactants charged. Lesser amounts may be used but the mixture is then more difficult to stir properly. Larger quantities show no advantage when ultraviolet rays are used and present the additional waste disposal problem.

Stoichiometrically the process involves the reaction of two moles of monohydric phenol with one mole of ketone to produce the bisphenol. It was found in this invention that the molar ratio of phenol to ketone charged had little or no effect upon the yield of crude bisphenol produced. Over a range of from 2 to about 7 moles of phenol per mole of ketone there was obtained an almost quantitative yield of crude bisphenols. However, the lower ratios gave colored crude products which were more difficult to purify and consequently gave lower yields of pure bisphenols. Therefore, the preferred molar ratio of monohydric phenol:ketone is about 4:1.

Among the monohydric phenols useful in the present process are phenol and ortho substituted phenols wherein the ortho substituents are halogen atoms and alkyl radicals containing up to about 6 carbon atoms such as ortho-cresol, ortho-ethylphenol, 2,6-dimethylphenol and ortho-chlorophenol.

Suitable ketones which can be used in this invention are those ketones which are devoid of ethylenic or acetylenic unsaturation. For the purposes of this invention, however, an aromatic benzene ring is to be considered a saturated group; whereas, a vinyl, allyl or ethynyl group is considered an unsaturated group. The suitable ketones may be represented by the graphic formula

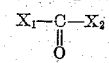

wherein $X_1$ and $X_2$ represent (a) a normal alkyl radical, such as methyl, ethyl, propyl, butyl, pentyl or hexyl; (b) a cycloalkyl radical, such as cyclopentyl or cylohexyl; (c) an alkyl substituted cycloalkyl radical; and (d) a phenyl group; and wherein $X_1$ and $X_2$ may be the same or different from each other, and wherein $X_1$ and $X_2$ together may be a single cycloalkyl or substituted cycloalkyl radical.

After the bisphenols have been produced as herein described the organic layer is separated from the aqueous layer and washed free of anions and cations present due to the acidic condensation agent charged. This washing can be carried out at room temperature, or at elevated temperatures up to the boiling point of water. If desired the bisphenol can be dissolved in a water insoluble diluent at from about 50° C. to about 100° C. and this solution can then be washed with water at the elevated temperature. The bisphenol can then be recovered as a residue product from the solution by distilling off excess reactants and added solvents at reduced pressures.

The following examples further serve to illustrate this invention.

*Example 1*

A three-liter three-necked Pyrex flask was equipped with a stirrer, heating mantle, thermometer and reflux condenser. To the flask was added a mixture of 565 g. of phenol (6 moles), 87 g. of acetone (1.5 moles) and 1304 g. of 37% aqueous hydrochloric acid. The mixture was stirred for about 7 hours while being irradiated with ultraviolet rays from two 100 watt mercury vapor lamps, which were placed within one inch of the flask below the liquid level. During this period of irradiation the temperature rose from 30° C. to 55° C. and was held at the reflux temperature, 55° C., for about 7 hours. The reaction mixture was then cooled to room temperature and the organic layer was separated from the aqueous layer by decantation. The organics were dissolved in about 300 g. of toluene at about 60° C. and washed with water until free of chloride ions as determined with silver nitrate. The washed organics were distilled at a pressure of about 10 to 20 mm. of mercury to a residue temperature in the still of 200° C. A light tan crystalline residue of 2,2-bis-(4-hydroxyphenyl)-propane was obtained. Yield was 342 g., which represents a 100% yield based on the weight of acetone charged.

*Example 2*

Example 1 was repeated using 282 g. of phenol (3 moles), 58 g. of acetone (1 mole) and 680 g. of 37% aqueous hydrochloric acid. The yield of light tan 2,2-bis-(4-hydroxyphenyl)-propane was 190 g. which represents an 84% yield based on the weight of acetone charged.

*Example 3*

Example 1 was repeated using 565 g. of phenol (6 moles), 174 g. of acetone (3 moles) and 1476 g. of 37% aqueous hydrochloric acid. The yield of light tan 2,2-bis-(4-hydroxyphenyl)-propane was 684 g., which represents a 100% yield based on the weight of acetone charged.

*Example 4*

Example 1 was repeated using 513 g. of phenol (5.45 moles), 58 g. of acetone and 1142 g. of 70% aqueous sulfuric acid. After separating the organic layer from the aqueous layer, the organics were washed until free of sulfate ions as determined with barium chloride. The washed organics were distilled as described in Example 1 leaving a light colored crystalline residue of 2,2-bis-(4-hydroxyphenyl)-propane. Yield of bisphenol was 222 g., which represents a 98% yield based on the weight of acetone charged.

*Example 5*

A mixture of 513 g. of phenol (5.45 moles) and 58 g. of acetone (1 mole) was added to the apparatus described in Example 1 and irradiated with ultraviolet rays from two 100 watt mercury lamps for 5 hours at 55° to 90° C. After cooling to 40° C. 1142 g. of 37% aqueous hydrochloric acid was added and the reaction mixture was stirred for another 7 hours without further irradiation at about 55° C. The reaction mixture was then treated as described in Example 1. There was obtained 211 g. of a light colored crystalline residue of 2,2-bis-(4-hydroxyphenyl)-propane, which represents a 93% yield based on the weight of acetone charged.

*Example 6*

A mixture of 376 g. of phenol (4 moles), 98 g. of cyclohexanone (1 mole) and 948 g. of 37% aqueous hydrochloric acid was added to the apparatus described in Example 1. The reaction mixture was irradiated with ultraviolet rays from two 100 watt mercury lamps for 7 hours at about 55° C. under continuous stirring, and was then cooled to 20° to 25° C. and the organic layer separated from the aqueous acid layer by decantation. The organic layer was then dissolved in about 300 g. of toluene at about 60° C. and washed with several 500 ml. aliquots of water until free of chloride ions. The washed toluene solution was distilled at a pressure of about 10 to 20 mm. of mercury to a residue temperature in the still of 200° C. A light tan crystalline residue of 1,1-bis-(4-hydroxyphenyl)-cyclohexane was obtained, which melted at 186°–189° C. Yield of bisphenol was 250 g., which represents a 93% yield based on the weight of cyclohexanone charged.

*Example 7*

Four stainless steel containers, each having a capacity of about 100 ml. were charged with 80 g. of a mixture consisting of phenol and acetone in the molar ratio of 4:1. The sealed containers were irradiated with a 200 mega-R.E.P. beta ray dose in a Van de Graff accelerator for 1.1 hours at a temperature ranging from 25° C. at the start of irradiation to about 90° C. Three hundred and ten grams of the irradiated mixture was then added to 620 g. of 70% aqueous sulfuric acid and stirred at 40° C. for about 7 hours without further irradiation. The 2,2-bis-(4-hydroxyphenyl)-propane was recovered as described in Example 4. Yield of bisphenol was 152 g. which represents a 95% yield based on the weight of acetone charged.

What is claimed is:

1. Process for producing 2,2-bis-(4-hydroxyphenyl)-propane, which comprises the steps of preparing a reactive mixture of phenol, acetone and aqueous hydrochloric acid, agitating the mixture while irradiating with ultraviolet rays at a temperature of from about 30° C. to about 55° C. for a period of time sufficient to cause said reactants to react and produce 2,2-bis-(4-hydroxyphenyl)-propane, and then separating the produced 2,2-bis-(4-hydroxyphenyl)-propane.

2. Process for producing 2,2-bis-(4-hydroxyphenyl)-propane, which comprises the steps of preparing a mixture of phenol and acetone, agitating the mixture while irradiating with ultraviolet rays at a temperature of from about 55° C. to about 90° C., adding aqueous hydrochloric acid thereto, stirring at about 55° C. for a period of time sufficient to cause said reactants to react and produce 2,2-bis-(4-hydroxyphenyl)-propane, and then separating the produced 2,2-bis-(4-hydroxyphenyl)-propane.

3. Process for producing 2,2-bis-(4-hydroxyphenyl)-propane, which comprises the steps of preparing a mixture of phenol and acetone, irradiating said mixture with beta rays at a temperature of from about 25° C. to about 90° C., adding aqueous hydrochloric acid thereto, stirring at about 40° C. for a period of time sufficient to cause said reactants to react and produce 2,2-bis-(4-hydroxyphenyl)-propane and then separating the produced 2,2-bis-(4-hydroxyphenyl)-propane.

4. Process for producing 1,1-bis-(4-hydroxyphenyl)-cyclohexane, which comprises the steps of preparing a mixture of phenol, cyclohexanone and aqueous hydrochloric acid, irradiating said mixture with ultraviolet rays at about 55° C. while stirring for a period of time sufficient to cause said reactants to react and produce said 1,1-bis-(4-hydroxyphenyl)-cyclohexane and then separating the produced 1,1-bis-(4-hydroxyphenyl)cyclohexane.

5. Process for producing bisphenols, which comprises preparing a reactive mixture of a monocyclic monohydric phenol, a ketone free of aliphatic carbon-to-carbon double bonds, and acidic condensation agent and irradiating the mixture with ultraviolet rays to cause said reactants to react and produce bisphenols.

6. Process for producing bisphenols, which comprises preparing a reactive mixture of a monocyclic monohydric phenol, a ketone free of aliphatic carbon-to-carbon double bonds, and acidic condensation agent and irradiating the mixture with beta rays to cause said reactants to react and produce bisphenols.

7. Process for producing bisphenols, which comprises preparing a reactive mixture of a monocyclic monohydric phenol and a ketone free of aliphatic carbon-to-carbon multiple bonds, irradiating the mixture with ultraviolet rays, adding an acidic condensation catalyst to the irradiated mixture and reacting said mixture to produce bisphenols.

8. Process for producing bisphenols, which comprises preparing a reactive mixture of a monocyclic monohydric phenol and a ketone free of aliphatic carbon-to-carbon multiple bonds, irradiating the mixture with beta rays, adding an acidic condensation catalyst to the irradiated mixture and reacting said mixture to produce bisphenols.

9. Process for producing bisphenols which comprises the steps of preparing a reactive mixture of one mole of a ketone free of aliphatic carbon-to-carbon multiple bonds with at least about 2 moles of monocyclic monohydric phenol selected from the group consisting of phenol and ortho substituted phenols, wherein the ortho substituent is selected from the group consisting of a halogen atom and an alkyl radical, an acidic condensation agent, and irradiating the mixture at a reaction initiating temperature of from about 20° C. to about 100° C. with ultraviolet radiation so as to cause said reactants to react and produce said bisphenols, and isolating said produced bisphenols.

10. Process as claimed in claim 9, wherein the temperature is maintained at from about 40° C. to about 60° C.

11. Process for producing bisphenols, which comprises the steps of preparing a reactive mixture of one mole of a ketone free of aliphatic carbon-to-carbon multiple bonds with at least about 2 moles of monocyclic monohydric phenol selected from the group consisting of phenol and ortho substituted phenols, wherein the ortho substitutent is selected from the group consisting of a halogen atom and an alkyl radical, an acidic condensation agent, and irradiating the mixture at a reaction initiating temperature of from about 20° C. to about 100° C. with beta radiation so as to cause said reactants to react and produce said bisphenols, and isolating said produced bisphenols.

12. Process as claimed in claim 11, wherein the temperature is maintained at from about 40° C. to about 60° C.

13. Process for producing bisphenols, which comprises the steps of preparing a reactive mixture of one mole of a ketone free of aliphatic carbon-to-carbon multiple bonds with at least about 2 moles of monocyclic monohydric phenol selected from the group consisting of phenol and ortho substituted phenols, wherein the ortho substituent is selected from the group consisting of a halogen atom and an alkyl radical, irradiating the mixture at a temperature of from about 20° C. to about 100° C. with ultraviolet rays, adding an acidic condensation agent thereto, and stirring the mixture at a reaction initiating temperature of from about 30° C. to about 75° C. so as to cause said reactants to react and produce bisphenols, and isolating said produced bisphenols.

14. Process as claimed in claim 13, wherein the irradiation is carried out at from about 40° C. to about 60° C. and the mixture containing the acidic condensation agent is stirred at from about 40° C. to about 50° C.

15. Process for producing bisphenols, which comprises the steps of preparing a reactive mixture of one mole of a ketone free of aliphatic carbon-to-carbon multiple bonds with at least about 2 moles of monocyclic monohydric phenol selected from the group consisting of phenol and ortho substituted phenols, wherein the ortho substituent is selected from the group consisting of a halogen atom and an alkyl radical, irradiating the mixture at a temperature of from about 20° C. to about 100° C. with beta rays, adding an acidic condensation agent thereto, and stirring the mixture at a reaction initiating temperature of from about 30° C. to about 75° C. so as to cause said reactants to react and produce said bisphenols, and isolating said produced bisphenols.

16. Process as claimed in claim 15, wherein the irradiation is carried out at from about 40° C. to about 60° C. and the mixture containing the acidic condensation agent is stirred at from about 40° C. to about 50° C.

17. Process as claimed in claim 9, wherein at least about 4 moles of monohydric phenol are present per mole of ketone.

18. Process as claimed in claim 11, wherein at least about 4 moles of monohydric phenol are present per mole of ketone.

19. Process as claimed in claim 13, wherein at least about 4 moles of monohydric phenol are present per mole of ketone.

20. Process as claimed in claim 15, wherein at least about 4 moles of monohydric phenol are present per mole of ketone.

References Cited in the file of this patent

UNITED STATES PATENTS

| | | |
|---|---|---|
| 1,760,758 | Korten | May 27, 1930 |
| 1,977,627 | Greenhalgh | Oct. 23, 1934 |
| 1,978,849 | Kohn et al. | Oct. 30, 1934 |
| 2,650,253 | Rust et al. | Aug. 25, 1953 |
| 2,674,572 | Gundel et al. | Apr. 6, 1954 |

FOREIGN PATENTS

| | | |
|---|---|---|
| 309,002 | Great Britain | Apr. 2, 1929 |